April 1, 1952 — J. SAMPOGNA — 2,591,300
ANTISKID DEVICE
Filed Feb. 14, 1949

Joseph Sampogna
INVENTOR.

Patented Apr. 1, 1952

2,591,300

UNITED STATES PATENT OFFICE 2,591,300

ANTISKID DEVICE

Joseph Sampogna, Yonkers, N. Y.

Application February 14, 1949, Serial No. 76,273

1 Claim. (Cl. 152—228)

The present invention relates to new and useful improvements in anti-skid devices for motor vehicles and more particularly to a novel traction cleat construction for vehicle tires.

An important object of the invention is to provide means for easily and quickly attaching the traction cleat to a vehicle tire for self-adjustment according to variations in the tire pressure.

Another object is to provide a traction cleat including longitudinally as well as transversely extending anti-skidding teeth or cleats.

A further object is to provide a device of this character which is efficient and reliable in use, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
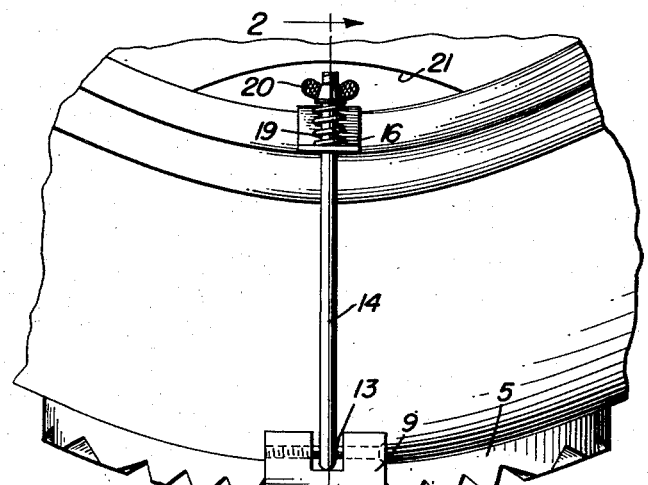
Figure 1 is a fragmentary side elevational view.
Figure 4:
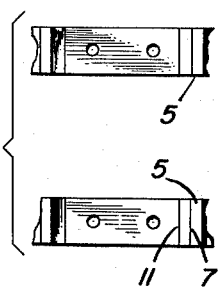
Figure 4 is a fragmentary plan view of the outer surface of the longitudinal cleat.
Figure 2:
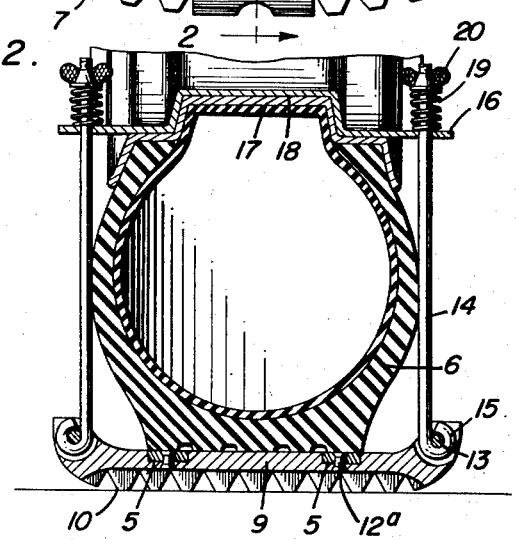
Figure 2 is a transverse sectional view taken on a line 2—2 of Figure 1.
Figure 5:
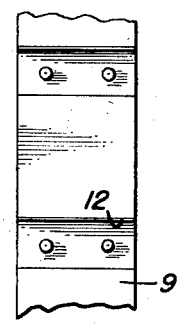
Figure 5 is a similar view of the inner surface of the transverse cleat.
Figure 3:
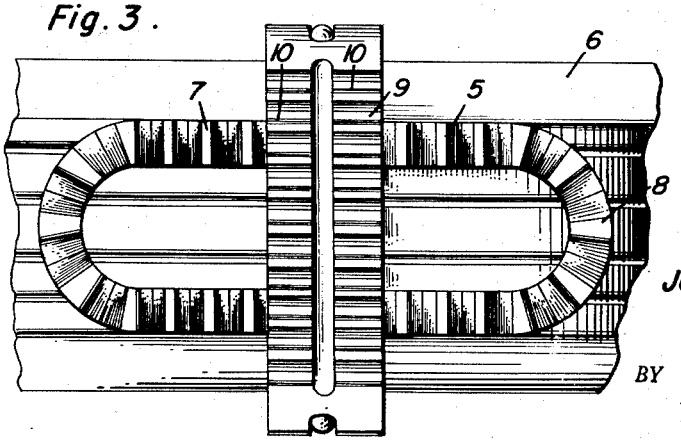
Figure 3 is a bottom plan view.

Referring now to the drawing in detail, wherein for the purpose of illustration I have disclosed a preferred embodiment of my invention, the numeral 5 designates an oval shaped longitudinal cleat of elongated form and made of stiff rubber, metal or other suitable material having its inner surface curved to conformably fit against the tread of a tire 6 and having its outer surface formed with transverse teeth or cleats 7 at its side portions and formed with radial teeth or cleats 8 at its curved end portions.

A transverse cleat 9 is positioned against the outer surface of cleat 5 and is also formed on its outer surface with teeth or cleats 10 arranged in parallel rows and which extend transversely of cleat 9 and longitudinally of the cleat 5.

The opposed surfaces of cleats 5 and 9 are formed with interfitting rabbets or grooves 11 and 12 to lock the cleats from twisting or shifting movement one with respect to the other and rivets 12a hold the cleats in assembled relation.

The outer ends of transverse cleat 9 are curved rearwardly and provided with transverse pins 13 on which a pair of rods 14 are pivoted by eyes 15. The rods being positioned at opposite sides of the tire and slidably positioned in the ends of a bar 16 positioned transversely of a tire rim 17, the bar being formed with an offset or drop center 18 to provide a seat for the drop center of the rim.

Coil springs 19 are placed on the inner ends of rods 14 and are held under tension against the bar 16 by thumb nuts 20.

In the operation of the device the bar 16 is inserted through an opening 21 in a vehicle wheel into a position transversely of the rim 17 and the cleats 5 and 9 placed against the tread of the tire and held in position by the rods 14 connecting the ends of cleat 9 to the ends of bar 16.

The coil springs 10 hold the cleats firmly against the tire and yield to variations in the pressure in the tire.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fuly comprehended by the spirit of the invention as herein described and the scope of the appended claim.

Having described the invention, what is claimed as new is:

A traction device for a vehicle wheel comprising a transverse cleat, a longitudinal cleat of elongated endless band form having parallel sides and rounded ends and attached to said transverse cleat and extending longitudinally beyond the sides thereof, and means for attaching one of said cleats to said wheel, said longitudinal cleat having transverse tread teeth spaced along its sides and radial teeth spaced around its ends.

JOSEPH SAMPOGNA.

REFERENCES CITED

The following references are of record in the file of this patent:

UNITED STATES PATENTS

| Number | Name | Date |
| --- | --- | --- |
| 1,079,273 | Standish | Nov. 18, 1913 |
| 1,147,549 | Rikmar | July 20, 1915 |
| 1,476,606 | Hall | Dec. 4, 1923 |
| 2,066,412 | Meckler | Jan. 5, 1937 |
| 2,231,113 | Dozier | Feb. 11, 1941 |
| 2,464,564 | Dunner | Mar. 15, 1949 |

FOREIGN PATENTS

| Number | Country | Date |
| --- | --- | --- |
| 830,563 | France | Aug. 3, 1938 |